United States Patent
Suzuki

(12) 
(10) Patent No.: US 6,233,110 B1
(45) Date of Patent: May 15, 2001

(54) DISC DRIVING DEVICE WITH ROTATIONAL VELOCITY CONTROL

(75) Inventor: Hiroyuki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/120,443

(22) Filed: Jul. 22, 1998

(30) Foreign Application Priority Data

Jul. 23, 1997 (JP) .................................................. 9-197470
Feb. 25, 1998 (JP) ................................................ 10-044108

(51) Int. Cl.$^7$ .................................................. G11B 15/46
(52) U.S. Cl. .................................... 360/73.03; 360/99.05; 360/69; 360/60
(58) Field of Search .............................. 360/73.03, 99.05, 360/99.12, 31, 69, 60, 75, 250, 254, 99.01, 133; 369/53, 58, 189, 190, 266, 267

(56) References Cited

U.S. PATENT DOCUMENTS

| | | |
|---|---|---|
| 5,103,358 | 4/1992 | Munekata . |
| 5,126,900 | 6/1992 | Munekata . |
| 5,166,846 | 11/1992 | Shigemoto . |
| 5,953,176 | * 9/1999 | Shimazu et al. ................... 360/73.03 |
| 5,998,947 | * 12/1999 | Shimizu et al. ................. 369/267 X |

FOREIGN PATENT DOCUMENTS 61-77161  4/1986  (JP) .

* cited by examiner

Primary Examiner—Alan T. Faber
(74) Attorney, Agent, or Firm—Oblon, Spivak, McClelland, Maier & Neustadt, P.C.

(57) ABSTRACT

A disc driving device for accommodating a disc-type recording medium (for example, a floppy disc) that provides reliable chucking and centering of the disc-type recording medium. The disc-type recording medium that is accommodated in the disc driving apparatus has a hub with a center opening, a chuck hole at a predetermined distance from the center opening, and a recording disc attached to the hub. The disc driving device includes a disc table with a major surface for loading the hub, a spindle shaft for fitting in the center opening, a chuck member for rotation and fitting in the chuck hole, a spindle motor for rotating the disc table, a head for recording and/or reproducing information signals for the recording disc loaded on the disc table, a cartridge holder for moving the recording disc between a loading position and an unloading position, and a system controller for controlling the rotational velocity of the disc table. The system controller controls the spindle motor such that when the recording disc is moved by the cartridge holder to the loading position, the recording disc is rotated at a first rotational velocity during a first period adequate to insure reliable centering and chucking and subsequently at a second rotational velocity slower than the first rotational velocity.

12 Claims, 13 Drawing Sheets

DISC DRIVING DEVICE WITH ROTATIONAL VELOCITY CONTROL

BACKGROUND OF THE INVENTION

1. Field of the Invention

This invention relates to a disc driving device for recording/reproducing information signals on or from a recording disc, such as a so-called floppy disc.

2. Related Art

There has so far been proposed a recording disc, such as a so-called floppy disc, constituted by a thin disc-shaped disc substrate on which is applied a recording layer, such as a magnetic layer. This recording disc is rotatably housed in a cartridge and used in this state. There has also been proposed a disc driving device adapted for recording/reproducing information signals using this recording disc as a recording medium.

In such disc driving device, the recording disc has its center hub of metal held by a disc table and is run in rotation by a spindle motor along with the disc table. The disc table has on its major surface a magnet for attracting the hub, a spindle shaft inserted into a center hole bored in the center portion of the hub and a chuck pin adapted to be inserted into a chuck hole bored in the hub at a pre-set separation from the center hole. The chuck pin is movable with respect to the major surface of the disc table. The inner diameter of the chuck hole is selected to be larger than the outer diameter of the chuck pin. If the disc table is run in rotation, with the spindle shaft inserted into the center hole, there is produced a rotational torque relative to the disc table by the load against rotation of the recording disc. The operation of inserting the spindle shaft in the center hole and of inserting the chuck pin in the chuck hole is herein termed a chuck operation. If the rotational torque is produced relative to the disc table, the chuck pin is moved relative to the spindle shaft by the inner edge of the chuck hole for centering the recording disc relative to the spindle shaft by the spindle shaft and the chuck pin.

For this recording disc, information signals are recorded or read out by a head device which is biased by a biasing member towards the major surface of the recording disc. This type of the disc driving device is disclosed in, for example, U.S. Pat. No. 5,166,846 or in U.S. Pat. No. 5,126,900.

In such recording disc, it is desired to increase the recording capacity and investigations for increasing the information recording density are proceeding. If the recording layer is a magnetic layer, the magnetic layer needs to be reduced in thickness for increasing the information recording density. If the recording layer is reduced in thickness, the force of biasing the magnetic head against the major surface of the magnetic disc, that is the head loading pressure, needs to be decreased in view of durability of the recording layer.

The reason is that if the recording layer is reduced in thickness with the head loading pressure remaining unchanged, the magnetic layer tends to be destroyed when the magnetic head is contacted with the major surface of the recording disc, as when rotation of the recording disc is stopped.

For increasing the recording density, it is possible to cause the recording head to fly relative to the recording disc, as is done in a hard disc drive, in order to prevent possible destruction of the major surface of the recording disc completely. In this case, it is also necessary to decrease the head loading pressure.

If, in a recording disc, the transfer speed of the information signals to be recorded or reproduced is to be increased, the rotational velocity has to be increased.

Meanwhile, in a disc driving device in which the head loading pressure is decreased for enabling the use of the recording disc having the magnetic layer reduced in thickness for increasing the density of the information signals, the load against rotation of the recording disc due to the head loading pressure is decreased. The result is that, when loading the conventional recording disc on this type of the disc driving device, there is a risk that the sufficient rotational torque with respect to the disc table on rotation of the disc table cannot be developed, such that the recording disc cannot be centered correctly. Specifically, the load against rotation of the recording disc is the sum of the torque $T(h)$ produced by the contact of the magnetic head with the recording disc and the torque $T(s)$ generated on contact with the recording disc of a liner provided in the cartridge. If this load $(T(h)+T(s))$ is smaller than the rotational torque $T(c)$ of the recording disc relative to the disc table, required for centering the recording disc, the recording disc cannot be centered even if the disc table is run in rotation. The rotational torque $T(c)$ required for centering the recording disc is of the order of approximately 15 gfcm. That is, for optimum centering and chucking of the recording disc, $(T(h)+T(s))>T(c)=15(gfcm)$ represents a necessary condition.

With the above-described disc driving device, since the torque $T(h)$ produced on contacting of the magnetic head with the recording disc is small, there is a risk that $(T(h)+T(s))<T(c)=15(gfcm)$ On the other hand, for using a recording disc capable of recording a large quantity of the information, it is desirable to rotate the disc table at a velocity higher than in the conventional system. If, in this case, the disc table is run in rotation at a high rotational velocity before completely loading the recording disc, there is a risk that the recording disc cannot be chucked reliably by the disc table.

SUMMARY OF THE INVENTION

It is therefore an object of the present invention to provide a disc driving device in which, when the head loading pressure is decreased for enabling the use of recording disc having the magnetic layer reduced in thickness for increasing the information recording density, the recording disc can be chucked reliably, and in which, if a conventional recording disc is used, the disc can be centered and chucked satisfactorily.

In one aspect, the present invention provides a disc driving apparatus for removably accommodating a disc-type recording medium, in which the apparatus includes a hub having a center opening and a chuck hole at a predetermined distance from the center opening, and a recording disc attached to the hub. The disc driving apparatus also includes a disc table having a major surface for loading the hub of the recording disc thereon, a spindle shaft provided on the major surface of the disc table and adapted for being fitted in the center opening in the hub, a chuck member provided on the major surface of the disc table for rotation relative to the major surface and adapted for being fitted in the chuck hole in the hub, a spindle motor for rotating the disc table, a head for recording/reproducing information signals for the recording disc loaded on the disc table, loading means for moving the recording disc between a loading position and an unloading position, and control means for controlling a rotational velocity of the disc table.

The control means controls the spindle motor so that, when the recording disc is moved by the loading means to the loading position, the recording disc is rotated at a first rotational velocity during a first period and subsequently at a second rotational velocity slower than the first first rotational velocity.

In another aspect, the present invention similarly provides a disc driving apparatus for removably accommodating a disc-type recording medium, in which the apparatus includes a hub having a center opening and a chuck hole at a pre-determined distance from the center opening, and a recording disc attached to the hub. The disc driving apparatus also includes a disc table having the major surface for loading the hub of the recording disc thereon, a spindle shaft provided on the major surface of the disc table and adapted for being fitted in the center opening, a chuck member provided on the major surface of the disc table for rotation relative to the major surface and adapted for being fitted in the chuck hole in the hub, a spindle motor for rotating the disc table, a head for recording/reproducing information signals for the recording disc loaded on the disc table, loading means for moving the recording disc between a loading position and an unloading position, and control means for controlling a rotational velocity of the disc table. The control means controls the spindle motor so that the disc table is rotated at a first rotational velocity when recording/reproducing information signals for the recording disc by the head. The control means also controls the spindle motor so that, when the recording disc is moved by the loading means to the loading position, the disc table is rotated at a second rotational velocity faster than the first rotational velocity at least for a predetermined period.

In yet another aspect, the present invention again provides a disc driving apparatus for removably accommodating a disc-type recording medium, in which the apparatus includes a hub having a center opening and a chuck hole at a pre-determined distance from the center opening, and a recording disc attached to the hub. The apparatus also includes a disc table having the major surface for loading the hub of the recording disc thereon, a spindle shaft provided on the major surface of the disc table and adapted for being fitted in the center opening, a chuck member provided on the major surface of the disc table for rotation relative to the major surface and adapted for being fitted in the chuck hole in the hub, a spindle motor for rotating the disc table, a head for recording/reproducing information signals for the recording disc loaded on the disc table, loading means for moving the recording disc between a loading position and an unloading position, and control means for controlling the rotational velocity of the disc table. The control means controls the spindle motor so that, when recording/reproducing information signals for the recording disc by the head, the disc table is rotated at a first rotational velocity. The control means also controls the spindle motor so that, when the recording disc is moved by the loading means to the loading position, the disc table is rotated at a second rotational velocity slower than the first rotational velocity at least for a predetermined period.

With the disc driving device according to the present invention, the recording disc for high density recording can be chucked reliably. In case of using a conventional recording disc, it can be chucked and centered reliably by the spindle shaft and the chuck pin, even although the head loading pressure is lowered for employing the recording disc of high recording density for reducing the load against rotation of the recording disc.

Thus, if, with the present disc driving device, a recording disc of the first sort or a recording disc of the second sort capable of recording information signals to a higher density than with the recording disc of the first sort, the recording disc can be loaded reliably without regard to whether the disc is of the first or second sort, even if the load against disc rotation is small because of the reduced head loading pressure.

DESCRIPTION OF PREFERRED EMBODIMENTS

Figure 1:
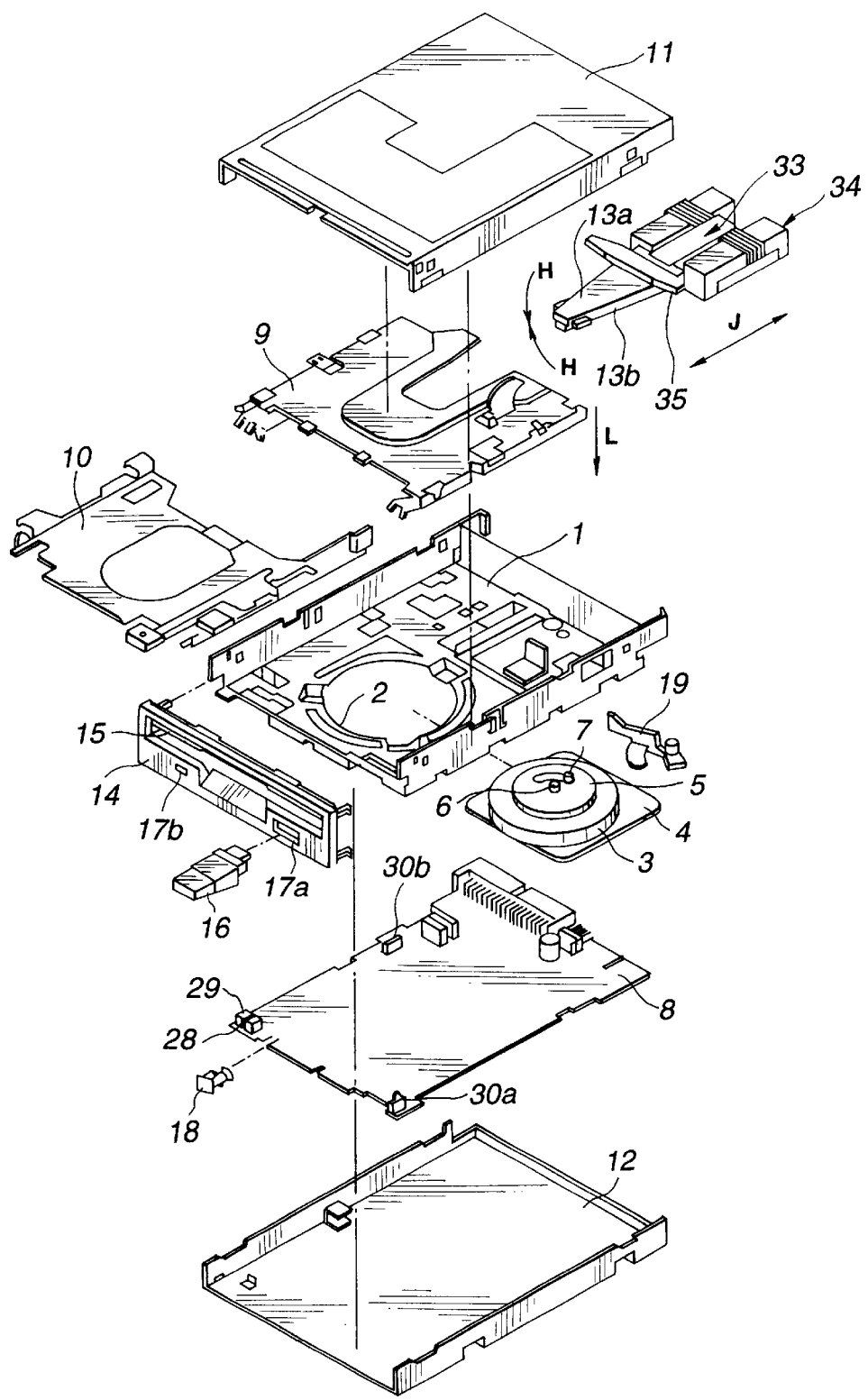
FIG. 1 is an exploded perspective view showing the structure of a disc driving device according to the present invention.

Referring to the drawings, preferred embodiments of the present invention will be explained in detail.

In the present embodiment, the disc driving device according to the present invention is configured as an apparatus in which a first sort of the recording disc used as a floppy disc up to now and a second sort of the recording disc capable of recording to a higher recording density than with the first sort of the recording disc can be selectively used as a recording medium for information signals.

Each recording disc includes a disc-shaped disc substrate formed of a synthetic resin material in a thin film and layers of a magnetic material deposited on both major surfaces of the disc substrate. In these recording discs, each layer of the magnetic material operates as a recording layer for information signals. The recording layer in the second sort of the recording disc is reduced in thickness than the recording layer in the first sort of the recording disc in order to improve the recording density of the information signals.

Figure 2:
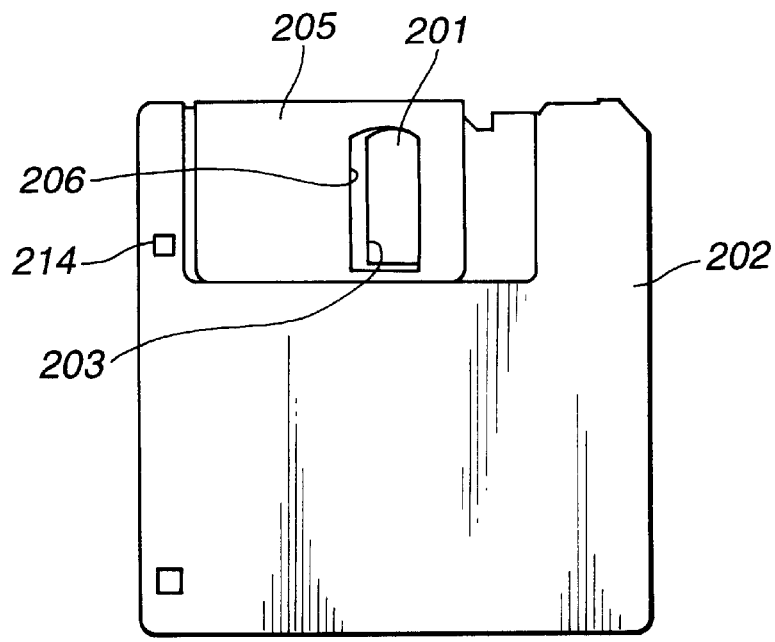
FIG. 2 is a plan view showing the structure of a first sort of the disc cartridge used in the disc driving device.
Figure 4:
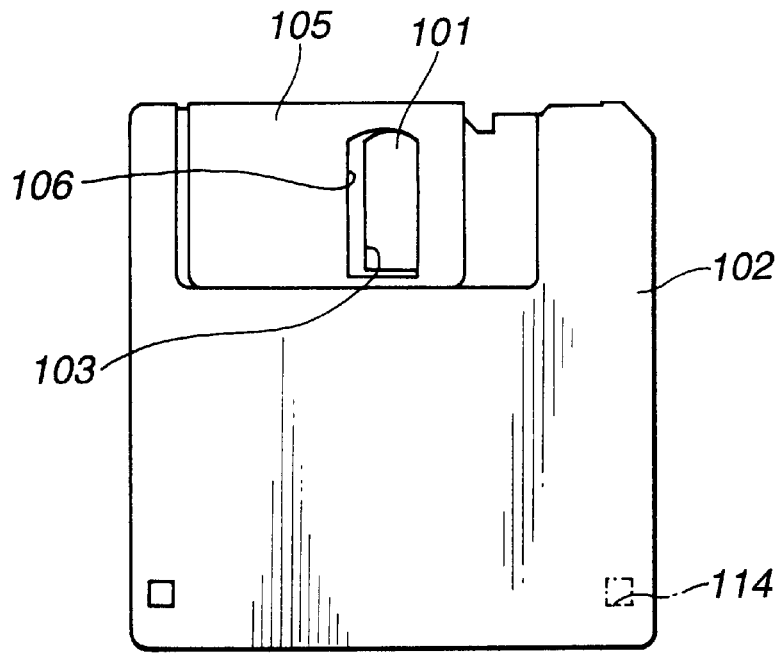
FIG. 4 is a plan view showing the structure of a second sort of the disc cartridge used in the disc driving device.

These recording discs 101 or 201 is housed in a rotatable state in cartridges 102 or 202 each in the form of a thin casing to constitute a disc cartridge, as shown in FIGS. 2 and 4. In these recording discs, the layer of the magnetic material operate as the recording layers for information signals. The signal recording area of the front side of the recording disc 101 or 201 is partially exposed to outside of the cartridge 102 or 202 via recording/reproducing aperture 103 or 203 formed in the upper surfaces of the cartridge 102 or 202. The signal recording area of the back side of the recording disc 101 or 201 is partially exposed to outside of the cartridge 102 or 202 via recording/reproducing aperture 104 or 204 formed in the bottom surface of the recording disc 101 or 201. The recording/reproducing apertures 103, 104, 203, 204 of the cartridges 102, 202 are formed in register with one another. The recording/reproducing apertures 103, 104, 203, 204 can be opened/closed by shutters 105, 205 slidably mounted on the cartridges 102, 202. The shutters 105, 205 are formed in a U-shaped cross-section from a thin metal sheet or a synthetic resin sheet and is supported for sliding along the sidewall sections of the cartridges 102, 202. The shutters 105, 205 are formed with apertures 106, 106, 206 and 206 in register with the recording/reproducing apertures 103, 104 and are slid in one direction along the lateral edges of the cartridges 102, 202. These shutters are moved on one direction along the lateral edges of the cartridges 102, 202 until the apertures 106, 106, 206, 206 are in register with the recording/reproducing apertures 103, 104, 203, 204 for opening the recording/reproducing apertures 103, 104, 203, 204. If the shutters 105, 205 are slid in the opposite direction along the lateral edges of the cartridges 102 or 202, the apertures 106, 106 may be offset from the recording/reproducing apertures 103, 104, 203, 204 for closing the apertures 103, 104, 203, 204.

Figure 3:
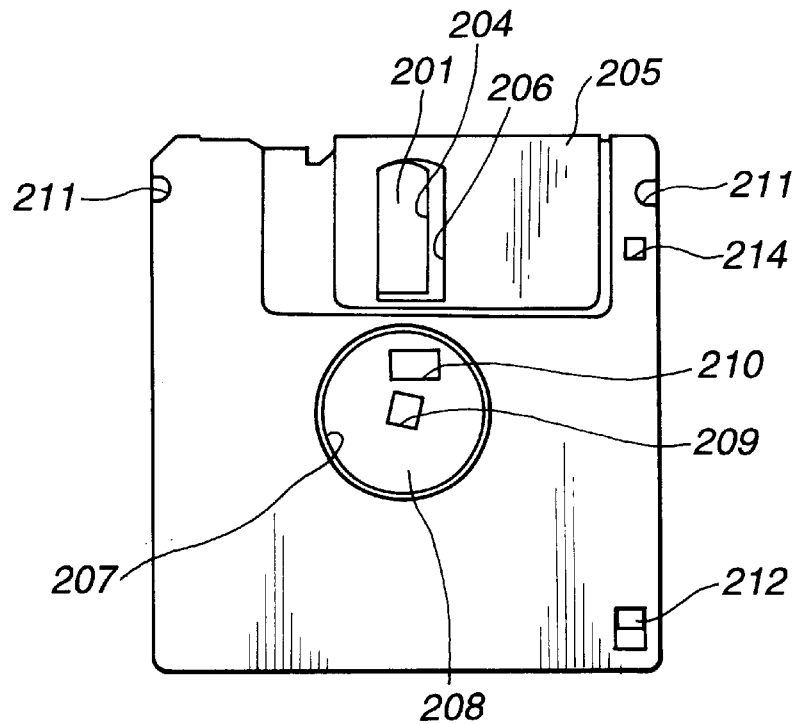
FIG. 3 is a plan view showing the structure of the first sort of the disc cartridge used in the disc driving device.
Figure 5:
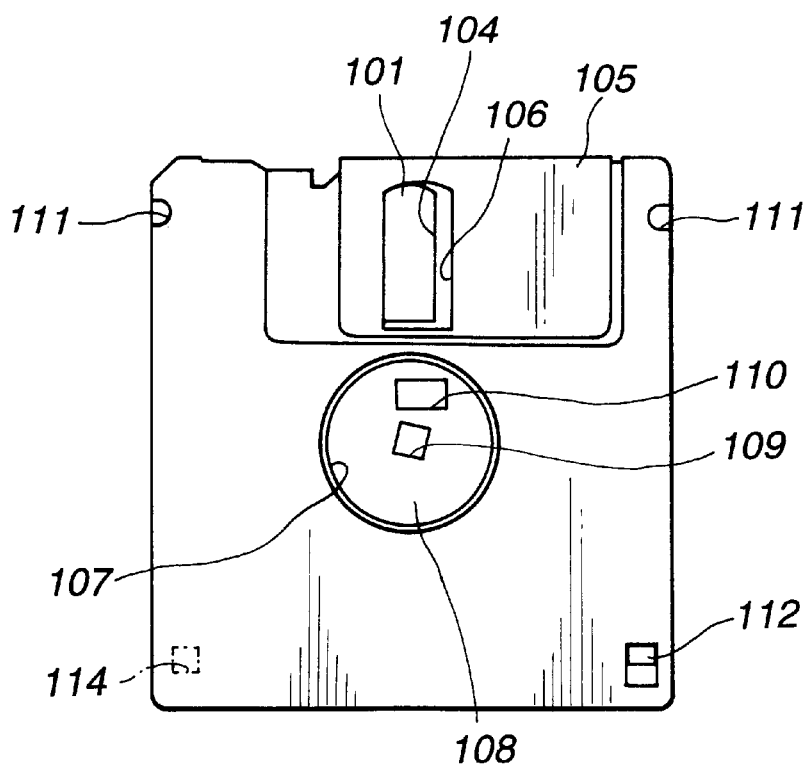
FIG. 5 is a plan view showing the structure of the second sort of he disc cartridge used in the disc driving device.

The center portions of the recording discs 101, 201 are formed with hubs 108, 208 formed in a disc shape from a magnetic material, such as iron, as shown in FIGS. 3 and 5. The hubs 108, 208 are formed with chuck holes 110, 210, at a pre-set distance from center holes 109, 209, respectively. The hubs 108, 208 are exposed to outside of the cartridges 102 or 202 via circular openings 107, 207 formed in the bottom surfaces of the cartridges 102, 202.

It is noted that the tracking servo information is recorded on the second sort of the recording disc 201 such that centering by the chuck pin 107 is not required. However, the chuck hole 210 is provided in order to enable both the first and second sorts of the recording discs to be used on the disc driving device.

Figure 6:
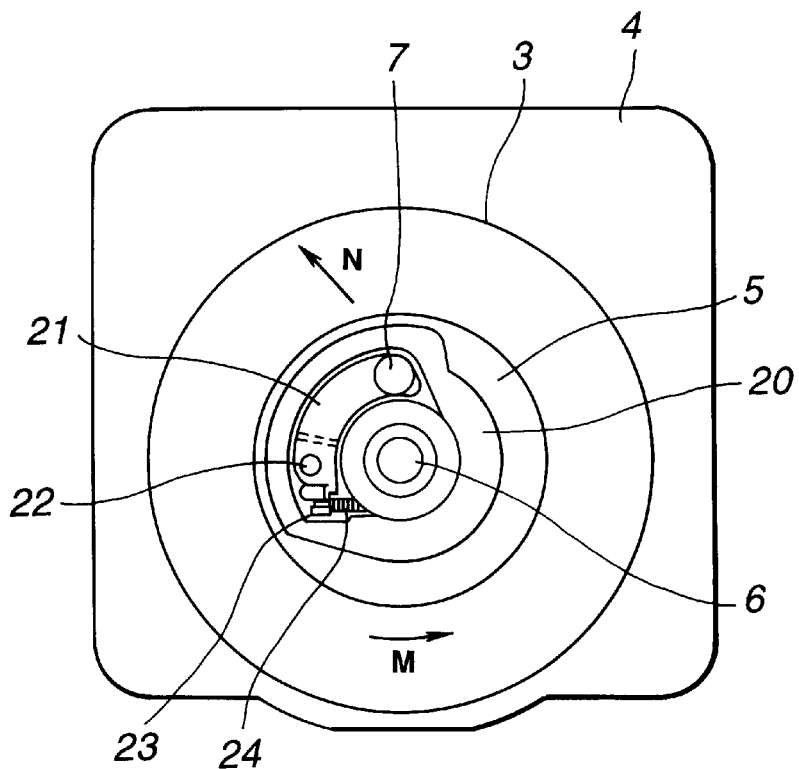
FIG. 6 is a plan view showing the structure of a disc table of the disc driving device.

Referring to FIG. 1, the disc driving device includes a chassis 1, formed as a substantially flat plate, and a spindle motor 3 fitted in a motor mounting hole 2 formed at a mid portion of the chassis 1 for facing the upper side of the chassis 1. This i spindle motor 3 is used for running the recording disc 101 in rotation. This spindle motor 3 is mounted on a stator substrate 4, as shown in FIG. 6. On a spindle shaft 6, operating as a driving shaft of the spindle motor 3, there is mounted a substantially disc-shaped disc table 5 on which to mount a hub 108 or 208 of the recording disc 101 or 201. The spindle shaft 6 has its distal end protruded at a mid portion on the upper major surface of the disc table 5. When the hub 108 or 208 is loaded on the disc table 5, the spindle shaft 6 is fitted in the center hole 109 or 209 of the hub 108 or 208 when the hub 108 or 208 is fitted in position on the disc table 5.

On the upper major surface of the disc table 5 is arranged a chuck pin 7. This chuck pin 7 is set upright on the distal end of a spring plate 21 which has its proximal end rotatably mounted via a supporting shaft 22 on the disc table 5. Specifically, the chuck pin 7 is movable relative to the disc table 5 along the axis of the spindle shaft 6 by flexing displacement of the spring plate 21, while being movable relative to the disc table 5 in a direction towards and away from the spindle shaft 6 by rotation about the supporting shaft 22 of the spring plate 21. The proximal end of the spring plate 21 is formed with a spring retainer 23. Between this spring retainer 23 and the disc table 5 is installed a coil spring 24 in a state of pulling the spring retainer 23 and the coil spring 24 towards each other. By the coil spring 24 pulling the proximal end of the spring plate 21 towards the spindle shaft 6 in a direction indicated by arrow M in FIG.6, the chuck pin 7 is resiliently biased towards outside in a direction away from the spindle shaft 6. When the hub 108 or 208 of the recording disc 108 or 208 is loaded on the disc table 5, the chuck pin 7 is fitted into the chuck hole 110 or 210 of the hub 108 or 208, respectively.

On the upper major surface of the disc table 5 is arranged a magnet 20 for attracting the hub 108 or 208. This magnet 20 is a so-called rubber magnet formed in a substantially toroidal shape.

On the lower surface of the chassis 1 is mounted an electronic circuit board 8 on which a variety of electronic circuits and detection switches are mounted, as will be explained subsequently. Below the chassis 1 is mounted a lower cover 12 for covering the lower surface of the electronic circuit board 8.

On top of the chassis 1 is mounted a cartridge holder 9 operating as a disc holder for holding the cartridge 102 for loading the recording disc 101 or 201 in the cartridge 102 on the disc table 5. Specifically, the cartridge holder 9 accommodates and holds the disc cartridge inserted therein from the forward side of the disc driving device and moves the disc cartridge towards below to load the recording disc 101 or 201 held therein on the disc table 5. The cartridge holder 9 is formed as a thin casing having its forward and lower sides opened to accommodate the disc cartridge inserted from the forward side.

On the chassis 1 is mounted a cam plate 10 for uplifting or lowering the cartridge holder 9. This cam plate 10 is also movable in the fore-and-aft direction along the guide of the chassis 1.

The cam plate 10 is arranged between the cartridge holder 9 and the chassis 1 and includes a pair of sidewall sections each having its lateral edge formed with a cam groove. In the cam groove of each sidewall section is engaged a pin protuberantly formed on both lateral sides of the cartridge holder 9.

When the cam plate 10 is positioned at back of the chassis 1, the cartridge holder 9 is at an upper position in which the recording disc 101 of the disc cartridge held therein is spaced above the disc table 5. When the disc table 5 is slid forwards of the chassis 1, the cartridge holder 9 is lowered as shown by arrow L in FIG. 1 to a lower position of loading the recording disc 101 of the disc cartridge held therein on the disc table 5.

The cam plate 10 is resiliently biased forwards by a biasing member, not shown. At back of the chassis 1 is provided a lock lever 19 for locking the cam plate 10 at the rearward position on the chassis 1.

On the forward edge of the chassis is mounted a front panel 14 formed with a slit 15 by which to introduce the disc cartridge. The front panel 14 is formed with an ejection button opening 17a for exposing an ejection button 16 to outside and an indicating lamp opening 17b for exposing an indicating lamp 18 to the outer forward side. If the ejection button 16 is pressed from the front side, an actuating plate 11 is moved rearwards to shift the cam plate 10 rearwards to lock the cam plate 10 by a lock lever 19.

On the chassis 1 are arranged paired arms, that is an upper head arm 13a as a first head arm and a lower head arm 13b as a second head arm. On the distal ends of these head arms 13a, 13b are mounted paired magnetic heads, that is an upper magnetic head and a lower magnetic head, for facing each other. These head arms 13a, 13b are resiliently biased in a direction in which the distal ends thereof approach to each other, as shown by arrow H in FIG. 1. That is, the magnetic head are biased in a direction towards each other. These head arms 13a, 13b are movable in the fore-and-aft direction corresponding to the disc radius direction.

Each of the head arms 13a, 13b has its proximal end supported by a head carriage 33 which is moved by a linear motor 34 in the fore-and-aft direction. The upper head arm 13a has holder engagement arms 35 which are protruded on both sides from the portion of the arm 13a closer to the proximal end than the mid portion and which are set on the cartridge holder 9, so that the upper head arm 13a is uplifted or lowered to follow up with the uplifting or lowering of the cartridge holder 9.

When the disc cartridge is loaded on the disc driving device, the disc cartridge is inserted via a slit 15 in the front panel 14 from the forward side of the disc driving device. The disc cartridge is accommodated and held in the cartridge holder 9. In the disc cartridge, the shutters 105, 205 are slid relative to the cartridges 102 or 202 to open the recording/ reproducing apertures 103, 104, 203, 204. The recording disc 101 or 202, facing the outside of the cartridges 102, 202 via the recording/reproducing apertures 103, 104 or 203, 204, is inserted into between the head arms 13a, 13b. That is, the major surfaces of the recording disc 101 or 201 are faced by magnetic heads 32a, 32b, respectively. That is, if the magnetic head is the second sort of the recording disc, which is rotated at an elevated speed, the magnetic head is maintained at a position of equilibrium between the pressure of an air layer produced on the major surface of the recording disc 201 and the biasing force produced by the head arms 13a, 13b. Conversely, if the dis is the first sort of the recording disc 101 which is rotated at a low speed, the magnetic heads are contacted with the major surfaces of the recording disc 101 by the head arms 13a, 13b.

The disc cartridge, thus inserted into the cartridge holder 9, is abutted against the lock lever 19 to unlock the cam plate 10 by the lock lever 19. The cam plate 10, released from the locking by the lock lever 19, is moved towards the forward side of the disc driving device under the bias of the biasing member. By the movement of the cam plate 10, the cartridge holder 9 is lowered towards the disc table 5.

Figure 7:
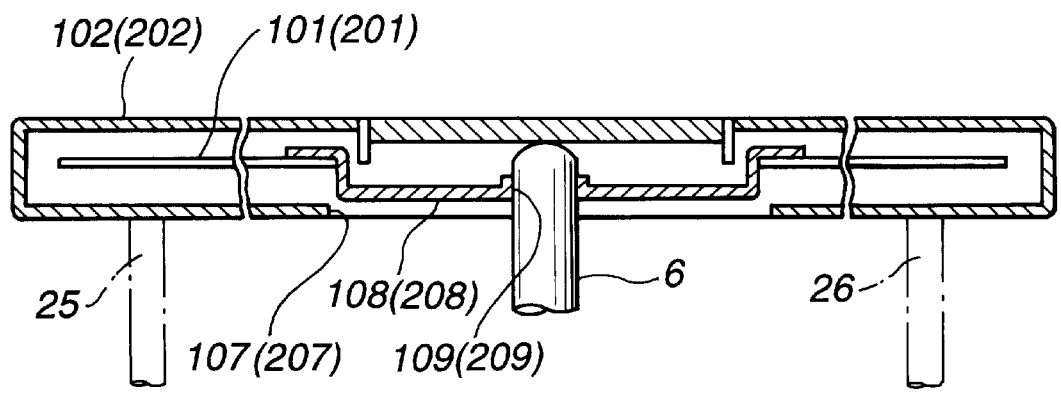
FIG. 7 is a longitudinal cross-sectional view showing the disc cartridge loaded on the disc driving device.

When the cartridge holder 9 is lowered in this manner, the cartridge 102 or 202, held by the cartridge holder 9, is positioned by having its four corners supported on the distal ends of the positioning pins 25, 26 set upright on the chassis 1, as shown in FIG. 7. When the cartridge 102 or 202 is positioned on the chassis 1, the presence of the cartridge 102 or 202 as well as the possible presence of plural discrimination holes formed in the bottom surface of the cartridge 102 or 202 can be detected by plural detection switches provided in the chassis 1 in association with the pre-set position of the bottom surface of the cartridge 102 or 202 and the positions of the discriminating holes. That is, a disc-in detection switch 28 for detecting the presence of the cartridge 102 or 202 is provided on the chassis 1. On the chassis 1, there is provided a write protection detection switch 29 in register with a write protection discrimination hole 112 in the cartridge 102 or 202. This write protection discrimination hole 112 is used for indicating whether or not the information signals already recorded on the recording disc 101 or 102 can be erased by overwrite recording or erasure. On the chassis 1, there is mounted a first disc capacity detection switch 30a in register with a first disc capacity discriminating hole 114 in the cartridge 102 of the first sort. This first disc capacity discriminating hole 114 indicates that the disc is a recording disc of the first sort. On the chassis 1, there is also mounted a second disc capacity detection switch 30b in register with a second disc capacity discriminating hole 113 in the cartridge 202. This second disc capacity discriminating hole 113 indicates that the disc is a recording disc of the second sort.

Figure 8:
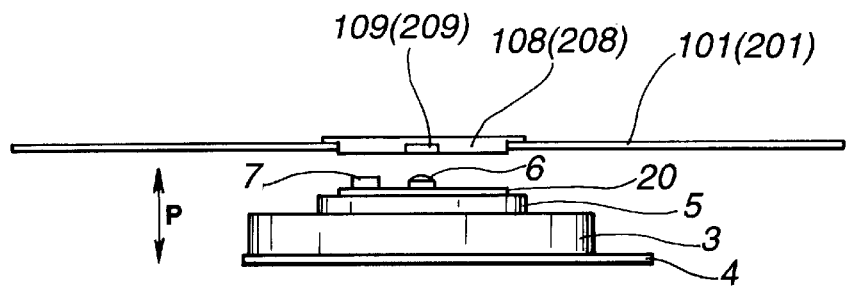
FIG. 8 is a side view showing a recording disc loaded on the disc table.
Figure 9:
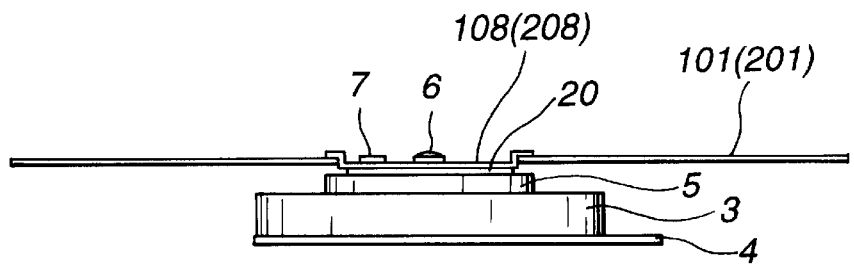
FIG. 9 is a side view of the disc table and a recording disc loaded thereon.
Figure 10:
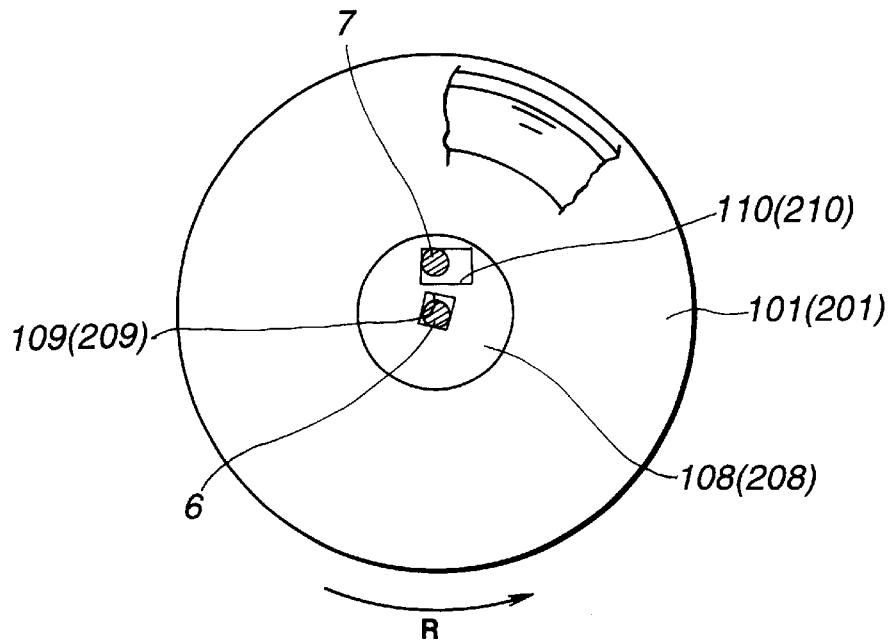
FIG. 10 is a bottom plan view showing a recording disc loaded on the disc table.

The hub 108 or 208 of the recording disc 101 or 201 is attracted by a magnet 20, as shown by arrow P in FIG. 8, so as to be set on the disc table 5, as shown in FIG. 9. The spindle shaft 6 is fitted in the center hole 109, 209. The chuck pin 7 is abutted against the hub 108 or 208 of the recording disc, so that, when the disc table 5 is run in rotation, the chuck pin 7 is inserted into the chuck hole 110 or 210.

Figure 11:
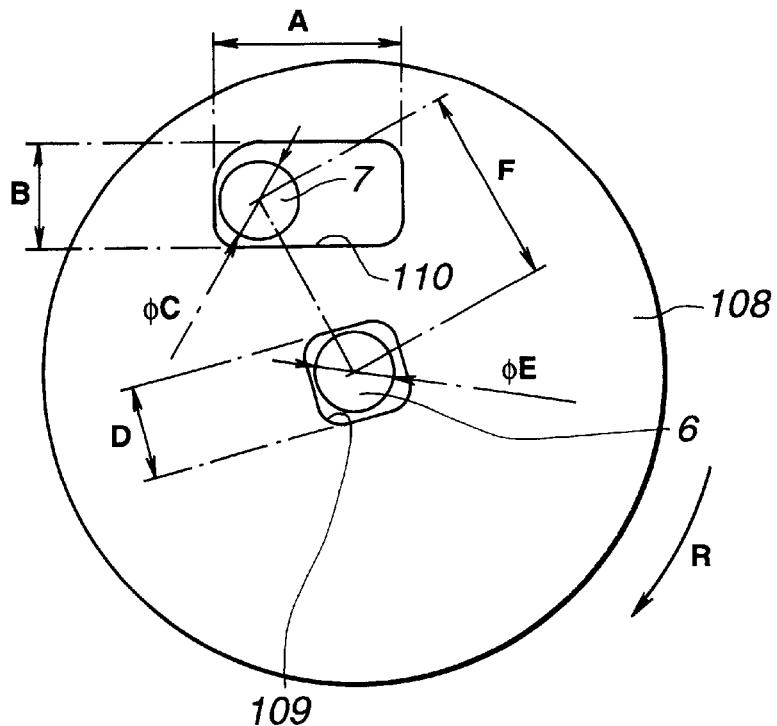
FIG. 11 is a plan view showing the relative position of a spindle shaft and a chuck pin when a hub of the first sort of the recording disc is chucked on the disc table.

The center hole 109 of the recording disc 201 of the first sort is in the form of a square having two corners rounded in the shape of a letter C. The diameter $\phi E$ of the spindle shaft 6 is shorter than the length D of one side of the substantially square-shaped center hole 109. The chuck hole 110 is formed as a rectangle having the length of the long side of A and the length of the short side of B, with the corners of the rectangle being rounded in the form of a letter B, as shown in FIG. 11. The diameter $\phi C$ of the chuck pin 7 is smaller than the length B of the chuck hole 110. In the initial state in which no load is applied on the chuck pin 7, the center-to-center distance of the spindle shaft 6 and the chuck pin 7 is F. With the center-to-center distance of the spindle shaft 6 and the chuck pin 7 equal to F, the outer peripheral surface of the spindle shaft 6 and the inner edge of the center hole 109 are not contacted with each other, while the outer peripheral surface of the chuck pin 7 and the inner edge of the chuck hole 109 also are not contacted with each other.

When the disc table 5 is rotated in the direction indicated by arrow R in FIG. 11, there is generated a relative rotational torque between the recording disc 101 and the disc table 5 as a result of the load against rotation of the recording disc 101. The load against rotation of the recording disc 101 is the sum of the torque T(h) produced by contact of each recording head with the recording disc 101 and the torque T(s) produced by contact of a lubricious liner, for example, in the cartridge 102. If the rotational torque of the recording disc 101 of the first sort with the disc table 5, the chuck pin 7 is moved by the inner edge of the chuck hole 110 in a direction, towards the spindle shaft 6 so that the recording disc 101 is centered by the spindle shaft 6 and the chuck pin 7 with respect to the spindle shaft 6. At this time, the outer peripheral surface of the spindle shaft 6 and the inner edge of the center hole 109 are contacted with each other, while the outer peripheral surface of the chuck pin 7 and the inner edge of the chuck hole 110 also are contacted with each other outer, with the center-to-center distance of the spindle shaft 6 and the chuck pin 7 being a distance G smaller than the distance F in the initial state.

Figure 12:
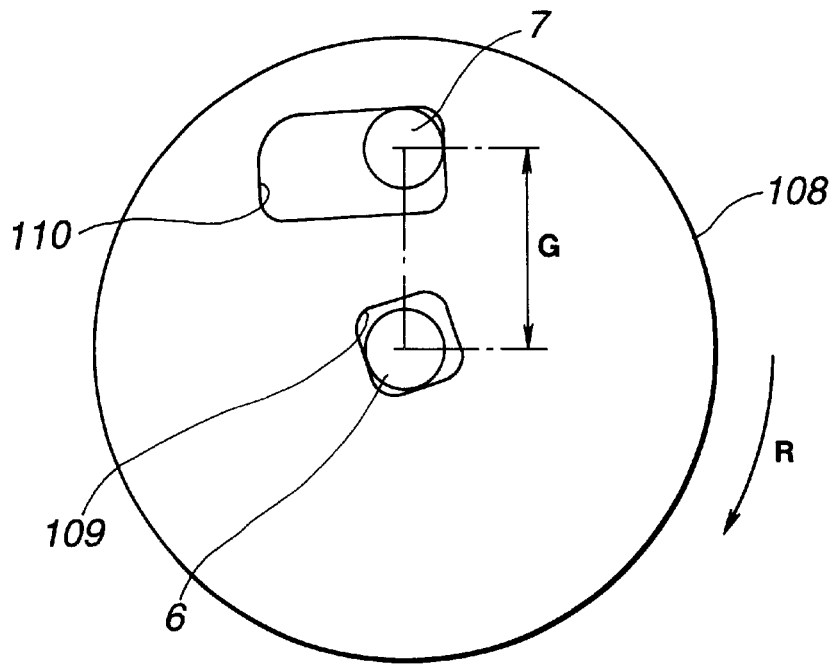
FIG. 12 is a plan view showing the relative position of the spindle shaft and the chuck pin when a hub of the first sort of the recording disc is centered on the disc table.

That is, the forward portion of the chuck hole 110 in the direction of rotation of the disc table 5 indicated by arrow R in FIG. 12 has a separation from the center opening 109 shorter than the rearward portion of the chuck hole 110 in the same direction.

Figure 13:
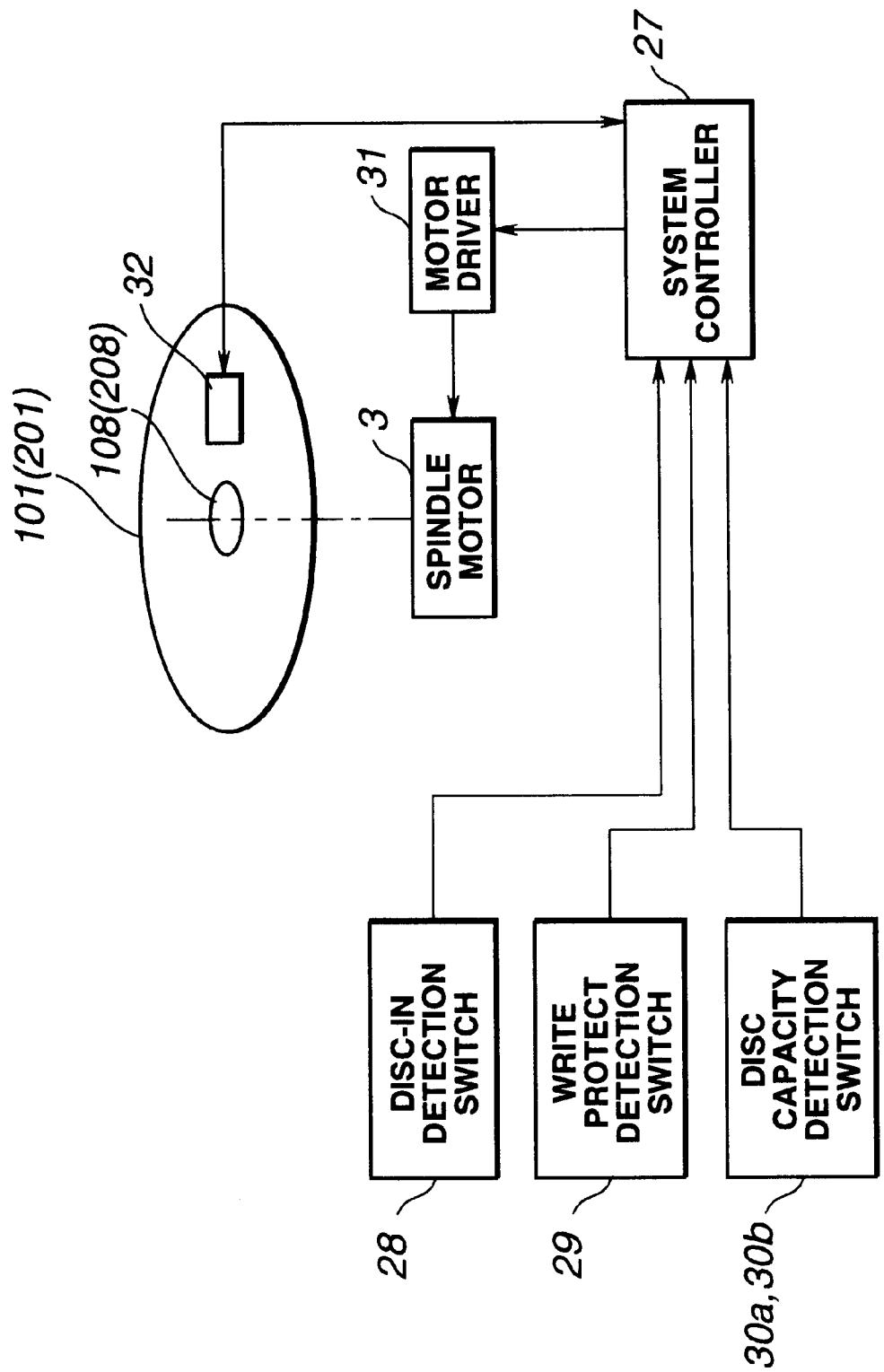
FIG. 13 is a block diagram showing the structure of the disc driving device.

The disc driving device has a system controller 27 for controlling the rotational speed of the spindle motor 3, as shown in FIG. 13. This system controller 27 is fed with detection signals from the disc-in detection switch 28, write protection detection switch 29 and the disc capacity detection switch 30a in order to control the rotational speed of the spindle motor 3 via a motor driver 31 based on these detection signals. The system controller 27 also controls the position and the operation of each magnetic head 32.

If the recording disc loaded on the disc table 5 is the recording disc 101 of the first sort, and if the information signals are written on or read out from the recording disc 101 by the magnetic head 32, the system controller 27 performs control to rotate the disc table 5 at a first rotational angular velocity ω1 (constant angular velocity). Also, if the recording disc loaded on the disc table 5 is the recording disc 101 of the second sort, and if the information signals are written on or read out from the recording disc 101 by the magnetic head 32, the system controller 27 performs control to rotate the disc table 5 at a second rotational angular velocity ω2 slower than the first rotational angular velocity ω1 (constant angular velocity).

Meanwhile, if, when chucking and centering the hub 108 of the recording disc 101 of the first sort on the disc table 5, the load (T(h)+T(s)) against rotation of the recording disc 101 of the first sort is smaller than the relative rotational torque T(c) between the recording disc 1 of the first sort and the disc table 5 required for centering the recording disc 1 of the first sort, the disc cannot be centered despite rotation of the disc table 5. The relative rotational torque T(c) required for centering the recording disc 1 of the first sort is of the order of approximately 15 gfcm. That is, for optimum chucking and centering of the recording disc 1 of the first sort, $$(T(h)+T(s))>T(c)=15 \text{ gfcm}$$

represents the necessary condition.

In the present disc driving device, the biasing force of the magnetic head 82 against the recording disc, that is the head loading pressure, is set to a weaker value in order to enable the use of a recording disc of the second sort 201 having a thin recording layer. Thus, with the present disc driving device, the torque T(h) produced by contact of the magnetic head 32 with the recording disc 101 of the first sort is of a smaller value. For sufficiently enlarging the load against the rotation of the recording disc 101, it is necessary to increase the rotational velocity of the disc table 5 in order to elevate the torque T(s) generated by contact of an inertia liner for example, in the cartridge 102 with the recording disc 101.

Figure 15:
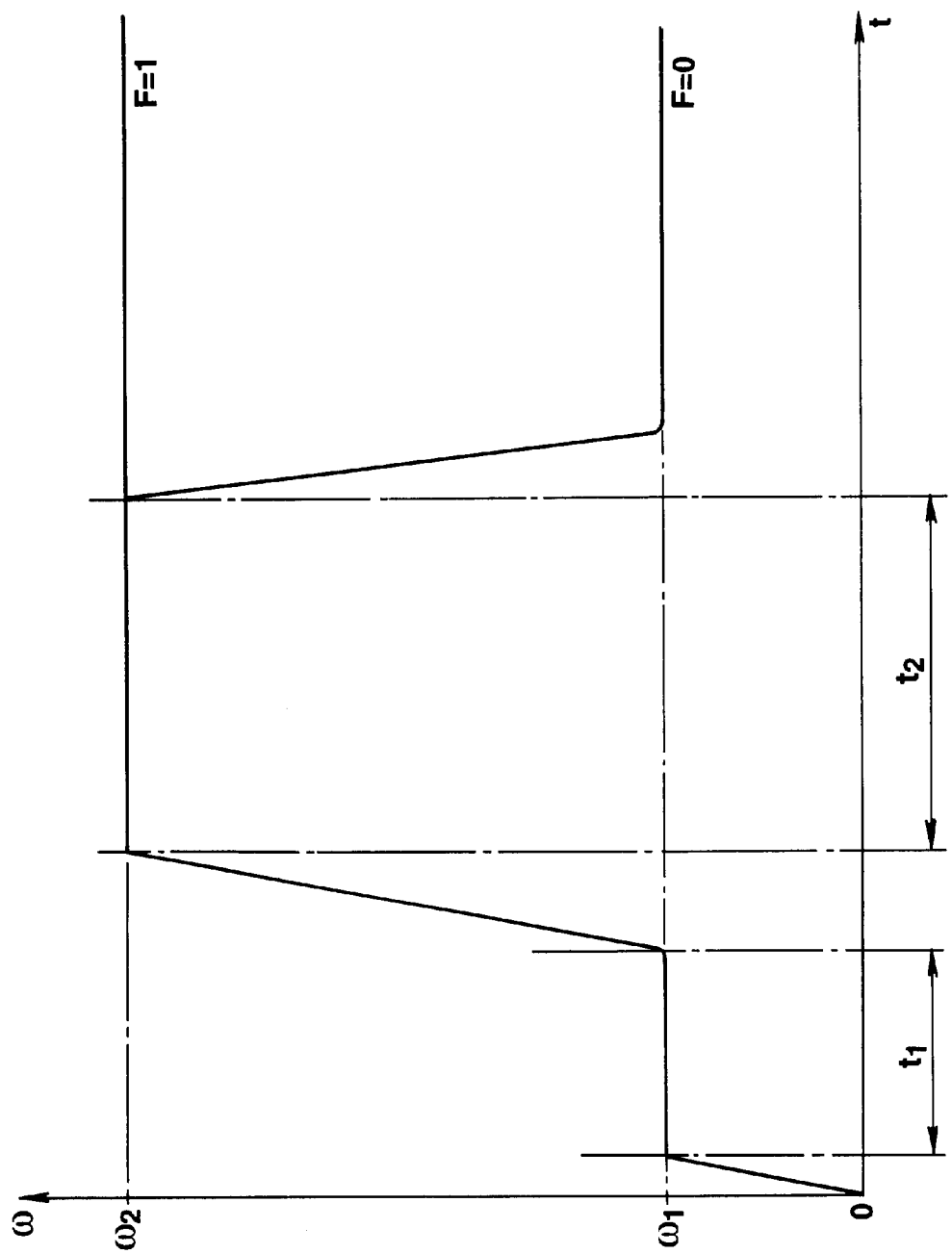
FIG. 15 is a graph of rotational angular velocity vs. pre-set time.

Thus, with the disc driving device, when the recording disc 101 of the first sort is loaded on the disc table 5, the system controller 27 performs control to set the rotational velocity of the disc table 5 to a first rotational angular velocity ω1 for a pre-set time t1, after start of rotation of the disc table 5 at time t0, in order to fit the chuck pin 7 into the chuck hole 110 by way of chucking. The graph of FIG. 15 plots the time elapsed and the rotational angular velocity of the disc table 5 on the abscissa and on the ordinate, respectively. The system controller 27 then sets the rotational angular velocity of the disc table 5 to a second rotational angular velocity ω1 for a pre-set time t2, for example, two or three seconds, by way of centering the spindle shaft 6 of the recording disc 101 of the first sort. The system controller 27 sets the rotational velocity of the disc table 5 to the first rotational angular velocity ω1 in order to enable writing or readout of the information signals on or from the recording disc of the first sort 101 by the recording head 32.

Also, with the disc driving device, when the recording disc 201 of the first sort is loaded on the disc table 5, the system controller 27 performs control to set the rotational velocity of the disc table 5 to the first rotational angular velocity ω1 for the pre-set time t1, after start of rotation of the disc table 5 at time t0, in order to fit the chuck pin 7 into the chuck hole 110. The system controller 27 then sets the rotational angular velocity of the disc table 5 to a second rotational angular velocity ω2 for a pre-set time t2. The system controller 27 sets the rotational velocity of the disc table 5 to the pre-set second rotational angular velocity ω2 for effecting writing or readout of the information signals on or from the recording disc of the second sort 201. Meanwhile, since tracking servo is executed with the second sort of the recording disc 101 as is executed in the hard disc drive, centering is not required with the second sort of the recording disc 101.

The reason the rotational velocity of the disc table 5 is set to the first rotational angular velocity ω1 for the pre-set time t1 before setting the rotational velocity of the disc table 5 to the second rotational angular velocity ω2 in any of the above cases is that, if the disc table 5 is rotated at an elevated rotational velocity of the second rotational angular velocity ω2 before the chuck pin 7 is not fitted in the chuck hole 110, the risk is high that chucking cannot be performed reliably.

Figure 14:
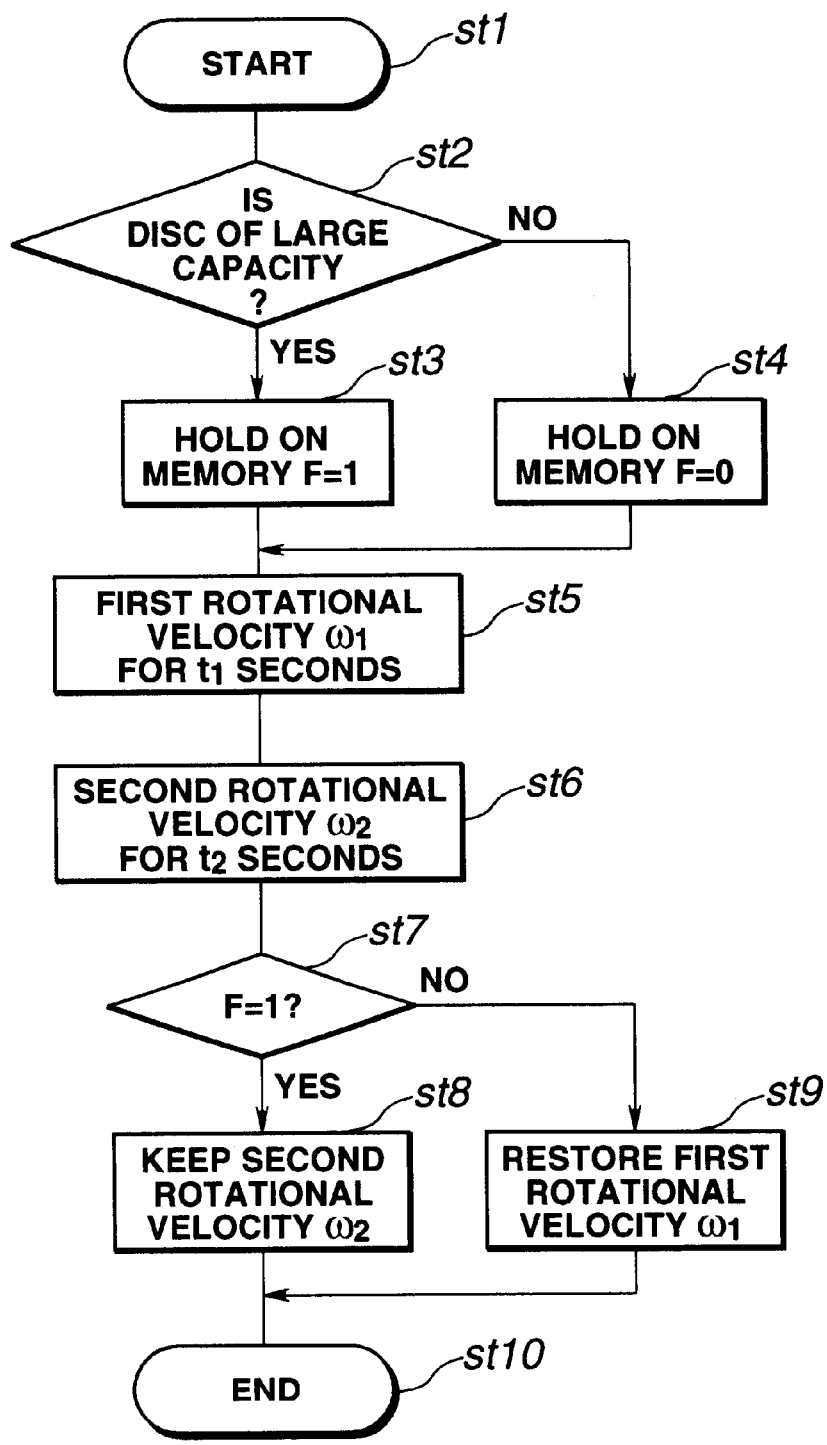
FIG. 14 is a flowchart showing the operation of control means of the disc driving device.

The operation of the system controller 27 for performing this control is explained with reference to the flowchart of FIG. 14. First, if the loading of the recording disc is detected by the disc-in detection switch 28, the program is started at step st1. Processing transfers to step st2 to discriminate whether the recording disc loaded on the disc table 5 is the recording disc of the first sort or the recording disc of the second sort 201 of an increased capacity. If it is the recording disc of the first sort 101 that has been loaded on the disc table 5, processing transfers to step st4.

At step st3, the necessary information relevant to the loading of the recording disc of the second sort 201 on the disc table 5 is stored in a memory, not shown, provided in the system controller 27. That is, a discrimination flag F is set to '1' before processing transfers to step st5. At step st4, the necessary information relevant to the loading of the recording disc of the first sort 101 on the disc table 5 is stored in the memory. That is, the discrimination flag F is set to '0' before processing transfers to step st5.

At step st5, the disc table 5 is rotated for a pre-set time t1 at the first rotational angular velocity ω1 before processing transfers to step st6. At step st6, the disc table 5 is rotated for a pre-set time t2 at the second rotational angular velocity ω2 before processing transfers to step st7.

At step st7, the discrimination flag F is checked. If the discrimination flag F is '1', processing transfers to step st8 and, if the discrimination flag F is '0', processing transfers to step st9.

At step st8, the disc table 5 is rotated at the second rotational angular velocity ω2 before processing transfers to step st10 to terminate the processing. At step st9, the disc table 5 is rotated at the first rotational angular velocity ω1 before processing transfers to step st10 to terminate the processing.

If, when processing transfers from step st7 to step st8 or to step st9, the recording disc is the recording disc of the first sort, the recording heads 32a, 32b are moved from the positions spaced apart from the recording disc 101 to a position contacted with the recording disc 101. If the recording disc is the recording disc of the second sort 20, the recording heads 32a, 32b may be moved to the position proximate to the recording disc 101 during the time processing transfers to step transfers from step st7 to step st8 or to step st9. Alternately, the recording heads 32a, 32b may be moved to the position proximate to the recording disc 201 during the time processing transfers to step transfers from step st6 to step st7.

Thus, in the state in which the rotational angular velocity of the recording disc is equal to the first rotational angular velocity ω1 and the second rotational angular velocity ω2 for the recording disc of the first sort 101 and for the recording disc of the second sort 102, respectively, the information signals can be written or read out for the recording disc by the magnetic heads 32a, 32b.

If, after the writing or readout of the information signals for the recording disc 101 or 201 by the magnetic heads 32a, 32b, writing or readout of the information signals is not performed for longer than a pre-set time, the so-called stand-by mode is entered to halt the rotation for the recording disc 101 or 201.

If the ejection button 16 is thrust, the actuating plate 11 and the cam plate 10 are moved rearwards, with the cam plate 10 being locked by the lock lever 19. Thus, the disc cartridge is spaced apart from the lock lever 5 and uplifted so as to be ejected via slit 15 to the forward outer side of the disc driving device.

Meanwhile, in the present disc driving device, the magnetic heads 32a, 32b can be set to the recording/reproducing position proximate to the recording disc 101 after the recording disc 101 or 201 is set on the disc table 5 and before the rotation for chucking or centering by the spindle motor 3 is initiated. Alternatively, the magnetic heads 32a, 32b can be set to the recording/reproducing position after the recording disc 101 is set on the disc table 5 and the rotation for chucking or centering by the spindle motor 3 is initiated. This corresponds to setting the torque T(h) to zero.

In order for the magnetic heads 32a, 32b to be moved to the recording/reproducing position after starting the rotation of the recording discs 101 or 201, there is provided a head movement control mechanism 36 for moving the magnetic heads 32a, 32b between the recording/reproducing position capable of writing or reading the information signals for the recording disc 101 or 201 and the standby position incapable of writing or reading the information signals. This head movement control mechanism 36 halts the magnetic heads 32a, 32b, which perform relative approaching movement to the recording disc 101 or 201 to follow up with the cartridge holder 9, at a standby position prior to reaching the recording/reproducing position, by the head arms 13a, 13b, before the recording disc 101 or 201 starts to be rotated by the disc table 5, in order to prevent the recording heads 32a, 32b from reaching the recording/reproducing position.

Specifically, the head arm 13a is formed by a spring plate in an elongated trapezoidal form. The upper magnetic head 32a is mounted on the lower surface of the distal end of the head arm 13a. The head carriage 33 is mounted on the lower surface of the proximal end of the head arm 13a. The upper head arm 13a is mounted in a downwardly tilted state on the head carriage 33, such that, when the cartridge holder 9 is in the loading position, the upper magnetic head 32a can be positioned in the recording/reproducing position on the upper surface of the recording disc 101 or 201 chucked by the spindle motor 5.

The upper head arm 13a has, on its lower surface at a mid portion along its length, a lift pin 39 which is adapted for compressing against the upper head arm actuating member 37 of the head movement control mechanism 36, while having on its upper surface a holder engagement arm 35 which is adapted for engaging with the upper surface of the cartridge holder 9.

Figure 16:
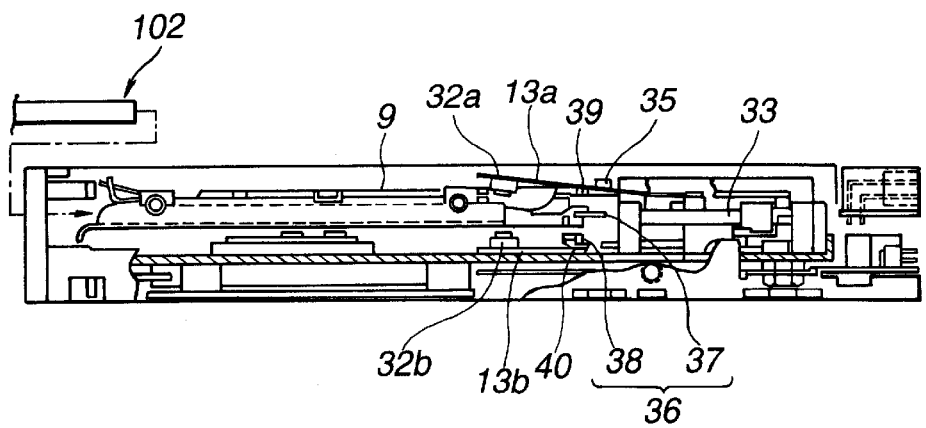
FIG. 16 is a side view showing the state in which each magnetic head is in standby state in the disc driving device.

When the cartridge holder 9 is in the unloading position, the upper head arm 13a is in an upwardly flexed state, via the upper surface of the cartridge holder 9 and the holder engagement arm 13, in order to form a clearance space for the upper magnetic head 32a, as shown in FIG. 16. The upper magnetic head 32a thus proves to be no hindrance to the insertion of the cartridge holder 9 into the disc cartridge.

Similarly to the upper head arm 13a, the lower head arm 13b also is formed by a spring plate in an elongated trapezoidal form. The upper magnetic head 32a is mounted on the lower surface of the distal end of the head arm 13a. The head carriage 33 is mounted on the lower surface of the proximal end of the head arm 13a. This upper head arm 13a is mounted in a downwardly tilted state on the head carriage 33, such that, when the cartridge holder 9 is in the loading position, the lower magnetic head 32b is positioned at the recording/reproducing position on the lower surface of the recording disc 101 or 201 loaded on the disc table 5.

Similarly to the upper head arm 13a, the lower head arm 13b includes, on the upper surface in a mid portion along its length, a lift pin 40 adapted for compressing against a lower head arm actuating member 38 of the head movement control mechanism 36.

Figure 17:
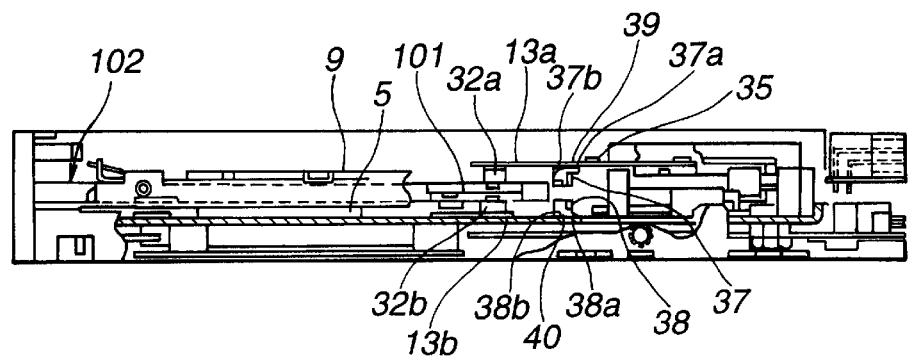
FIG. 17 is a side view showing each magnetic head is moving towards the recording/reproducing position in the disc driving device.
Figure 18:
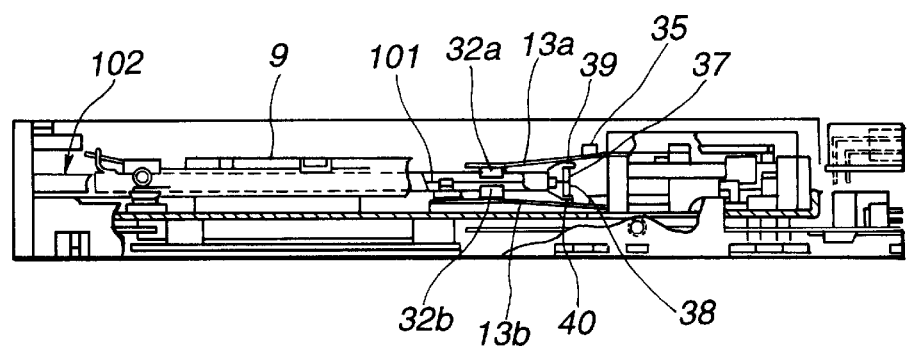
FIG. 18 is a side view showing each magnetic head is in the recording/reproducing position in the disc driving device.

The head movement control mechanism 36 includes an upper head arm actuating member 37 and the lower head arm actuating member 38, adapted for moving the upper head arm 13a and the lower head arm 13b from the initial position shown in FIG. 17 to the operating position shown in FIG. 18 for moving the upper magnetic head 32a and the lower magnetic head 32b from the stand by position to the recording/reproducing position. The head movement control mechanism 36 also includes a head arm actuating member driving mechanism for moving the upper and lower head arm actuating members 37, 38 from the initial position to the operating position or from the operating position to the initial position.

Figure 20:
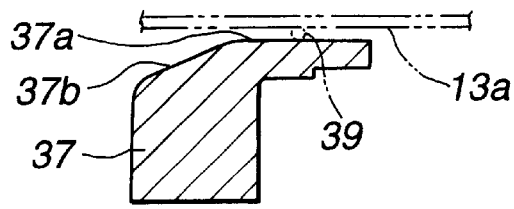
FIG. 20 is a longitudinal cross-sectional view showing the structure of an upper head arm actuating member constituting the magnetic head movement actuating unit of the disc driving device.
Figure 21:
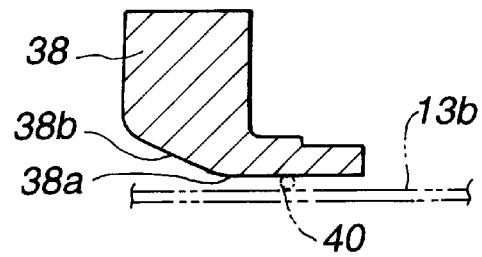
FIG. 21 is a longitudinal cross-sectional view showing the structure of a lower head arm actuating member constituting the magnetic head movement actuating unit of the disc driving device.
Figure 22:
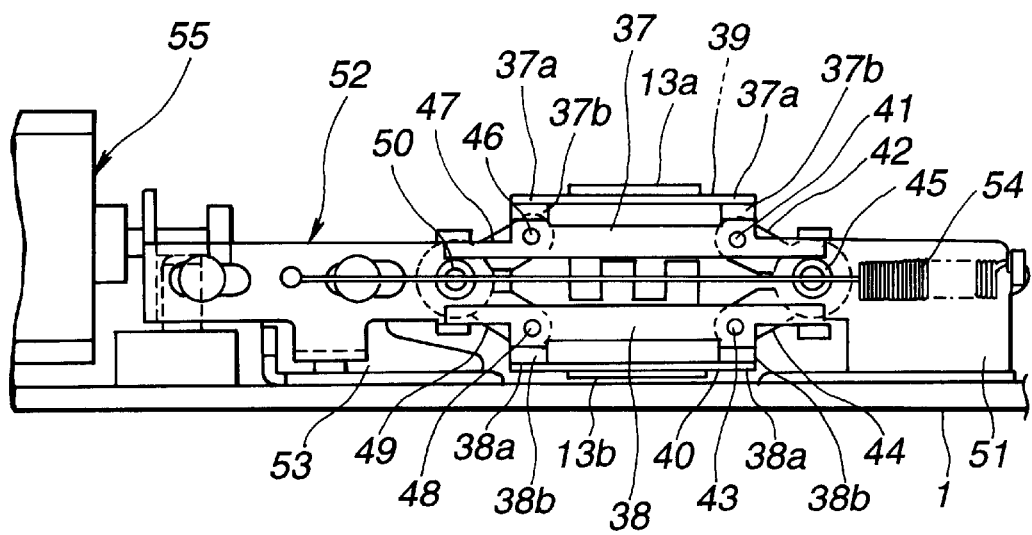
FIG. 22 is a front view showing the state in which the magnetic head movement actuating unit is in an initial state in the disc driving device.
Figure 23:
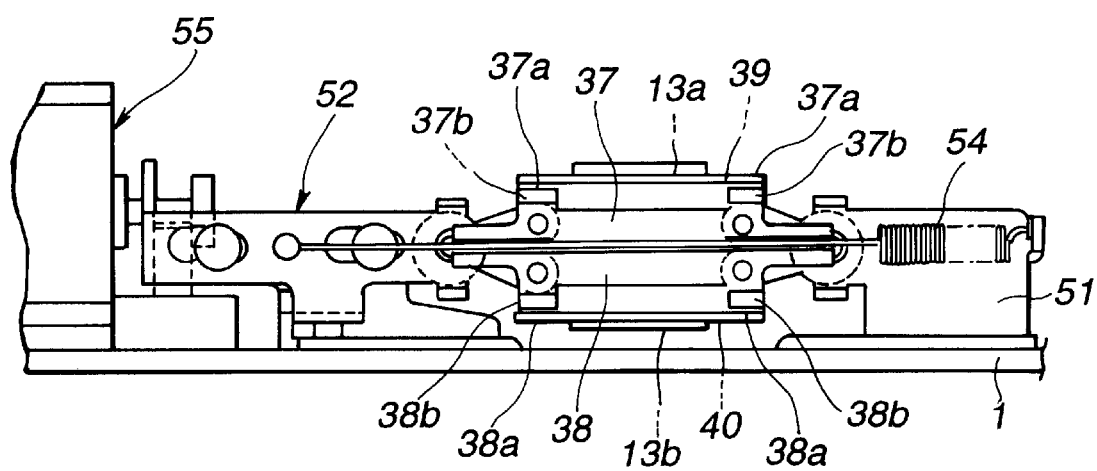
FIG. 23 is a front view showing the state in which the magnetic head movement actuating unit is in an operating state in the disc driving device.

The upper head arm actuating member 37 and the lower head arm actuating member 38 are adapted to be located substantially directly above and below the lift pins 39, 40 provided on the upper head arm 13a and the lower head arm 13b, respectively, when the head carriage 33 is moved to the outermost disc rim, as shown in FIGS. 20 and 21.

Figure 19:
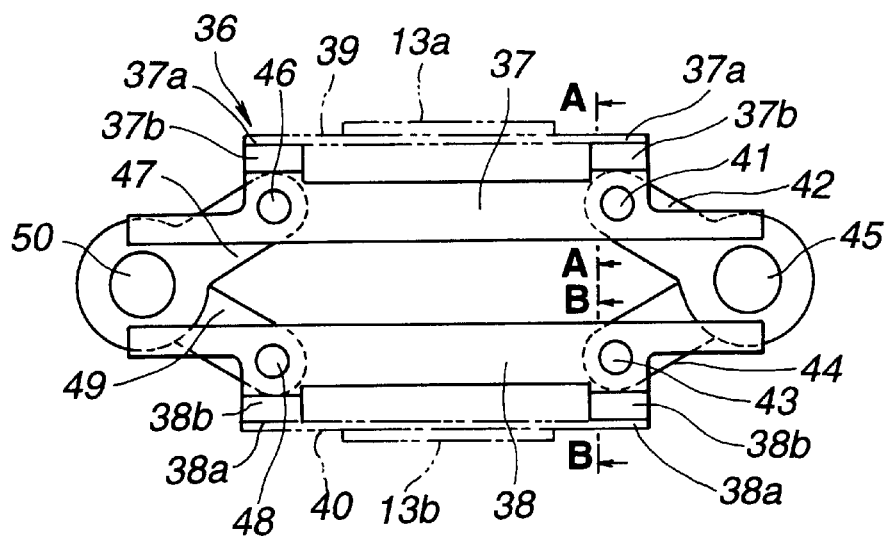
FIG. 19 is a front view showing the structure of a magnetic head movement actuating unit of the disc driving device.

On one end of the upper head arm actuating member 37 is rotatably mounted an end of a first link lever 42 by a first shaft 41, as shown in FIG. 19. Similarly, on one end of the lower head arm actuating member 38 is rotatably mounted an end of a second link lever 44 by a second shaft 43. The opposite side ends of the first and second link levers 42, 44 are rotatably interconnected by a third shaft 45 for interconnecting the one ends of the upper and lower head arm actuating members 37, 38.

On the opposite side end of the upper head arm actuating member 37 is rotatably mounted an end of a third link lever 47 by a fourth shaft 46. Similarly, on one end of the lower head arm actuating member 38 is rotatably mounted an end of a fourth link lever 49 by a fifth shaft 48. The opposite side ends of the third and fourth link levers 47, 49 are rotatably interconnected by a sixth shaft 50 for interconnecting the opposite side ends of the upper and lower head arm actuating members 37, 38.

The upper and lower head arm actuating members 37, 38 are formed as a so-called parallel link by the first to fourth link levers 42, 44, 47 and 49. If the gap between the third shaft 45 and the sixth shaft 50 is straitened, the upper and lower head arm actuating members 37, 38 are spaced apart from each other more prominently to an opened state. Conversely, if the gap between the third shaft 45 and the sixth shaft 50 is enlarged, the upper and lower head arm actuating members 37, 38 are drawn closer to each other to a closed state.

Each end of the upper head arm actuating member 37, that is portions of the upper head arm actuating member 37 in the vicinity of the first shaft 41 and the fourth shaft 46, is formed with a substantially horizontal lift pin abutment surface 37a and an inclined portion 37b of a downward gradient contiguous to the lift pin abutment surface 37a, as shown in FIG. 20. The lift pin abutment surface 37a is adapted for being abutted by the lift pin 39 of the head arm 13a which has been lowered along with the cartridge holder 9.

If the head carriage 33 is located at the outermost disc rim such that the upper and lower head arm actuating members 37, 38 are spaced apart from each other in the up-and-down direction, the lift pin 39 is abutted against the lift pin abutment surface 37a of the upper head arm actuating member 37, as shown in FIG. 20. The inclined portion 37b is inclined in a direction from the outer rim side to the inner rim side the of the recording disc 101 or 201 for approaching to the disc, and is formed for extending towards the center of the recording disc 101 or 201.

On both ends of the lower head arm actuating member 38, that is in the vicinity of the fourth shaft 43 and the fifth shaft 48, there are formed a substantially horizontal lift pin abutment surface 38a, abutted by the lift pin 40 provided on the lower head arm 13b, and an inclined portion 38b contiguous to the lift pin abutment surface 38a.

If the head carriage 33 is located at the outermost disc rim such that the upper and lower head arm actuating members 37, 38 are spaced apart from each other in the up-and-down direction, the lift pin 40 is abutted against the lift pin abutment surface 38a of the lower head arm actuating member 38, as shown in FIG. 21. The inclined portion 38b is inclined in a direction from the outer rim side to the inner rim side the of the recording disc 101 or 201 for approaching to the disc, and is formed for extending towards the center of the recording disc 101 or 201.

The third shaft 45, interconnecting the first and second link levers 42, 44, is mounted on a first stationary base block 51 set upright on the chassis 1, while the sixth shaft 50, interconnecting the third and fourth link levers 47, 49, is mounted on a slide plate 52. The slide plate is pulled by a coil spring 54 towards the first stationary base block 51 in order to keep the upper and lower head arm actuating members 37, 38 in the opened state.

Figure 24A:
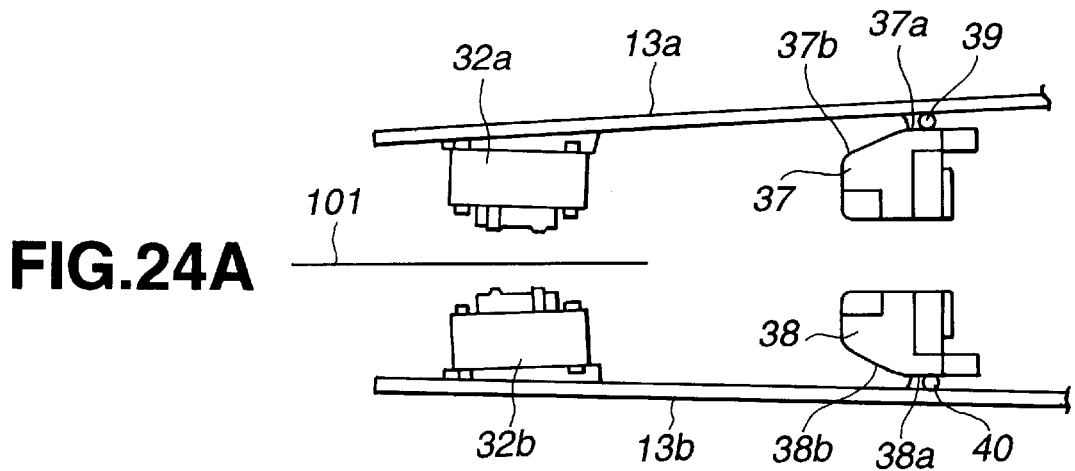
FIGS. 24A to 24C are schematic side views showing the state in which the magnetic head is moving from the stand-by position towards the recording/reproducing position in the disc driving device.

If, with the upper and lower head arm actuating members 37, 38 in the opened state, and with the head carriage 33 being set to the outermost position, the cartridge holder 9 is set to the loading position, and the upper head arm 13a is lowered in order to follow up with the descent of the cartridge holder 9, as shown in FIG. 17, the lift pin 39 of the upper head arm 13a is abutted against the lift pin abutment surface 37a of the upper head arm actuating member 37, as shown in FIG. 24A. Thus the upper head arm 13a is halted at the first position to keep the upper magnetic head 32a at the standby position to prevent the upper magnetic head 32a from being lowered to the recording/reproducing position. On the other hand, the lift pin abutment surface 38a of the lower head arm actuating member 38 is abutted against the lift pin 40 of the lower head arm 13b to halt the lower head arm 13b in order to keep the lower magnetic head 32b carried on the distal end thereof and in order to prevent the lower magnetic head 32b from being uplifted to the recording/reproducing position.

Figure 24B:
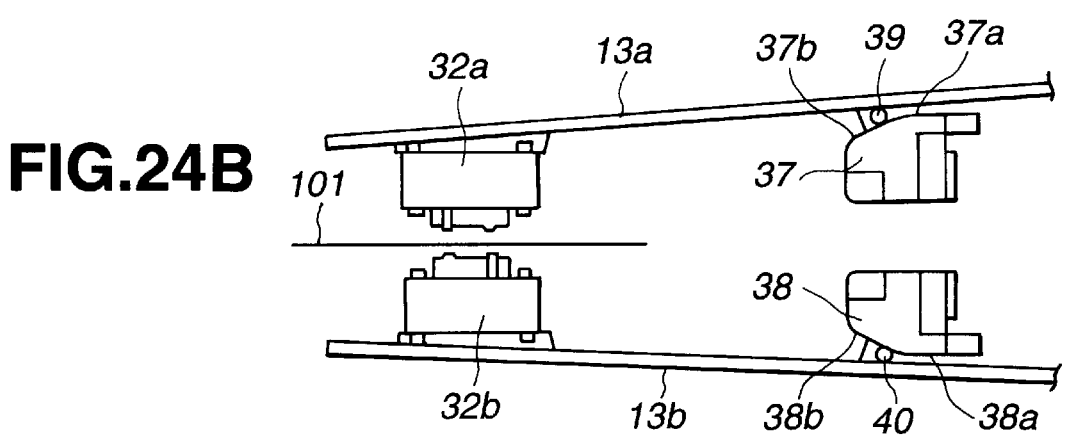
Figure 24C:
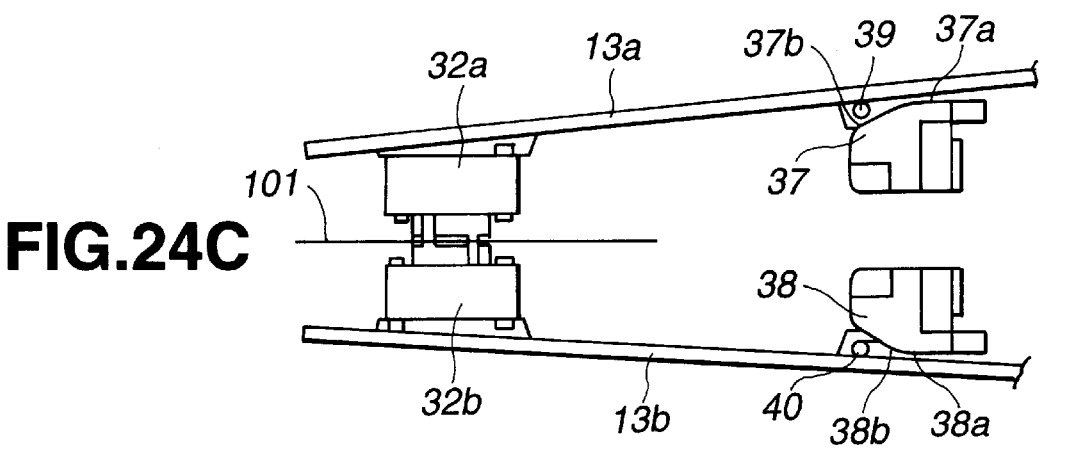

If the head carriage 33 is moved from the outer rim towards the inner rim of the recording disc 1, as shown in FIG. 24B, the upper head arm actuating member 37 and the lower head arm actuating member 38 progressively cancels the movement halted state for the head arms 13a, 13b, by allowing the first and second head arms 13a, 13b to slide on the inclined portions 37b, 38b in order to shift the recording heads 32a, 32b slowly from the standby position to the recording/reproducing position. This sets the magnetic heads 32a, 32b to the recording/reproducing position, as shown in FIG. 24C.

However, if, in this state, the outer rim portions of the recording disc 101 or 201 is recorded or reproduced, the magnetic heads 32a, 32b are spaced apart from the recording disc 101 or 201. Therefore, the slide plate 52 is slid by a solenoid 55 of the head arm actuating member driving mechanism, against the force of the coil spring 54, for setting up the closed vertically superimposed state of the upper and lower head arm actuating members 37, 38, as shown in FIG. 21. In this case, the upper and lower head arm actuating members 37, 38 are not contacted with the lift pins 39, 40 of the upper and lower head arms 13a, 13b, even if the head carriage 33 is moved to the outermost rim of the disc, with the magnetic heads 32a, 3 2b being then in the respective recording/reproducing positions.

What is claimed is:

1. A disc driving device for removably accommodating a disc-type recording medium including a hub having a center opening and a chuck hole at a pre-determined distance from said center opening, and a recording disc attached to said hub; said disc driving apparatus comprising:

a disc table having a major surface for loading the hub of the recording disc thereon:

a spindle shaft provided on the major surface of the disc table and adapted for being fitted in said center opening in said hub;

a chuck member provided on said major surface of said disc table for rotation relative to the major surface and adapted for being fitted in said chuck hole in said hub;

a spindle motor for rotating said disc table;

a head for recording/reproducing information signals for said recording disc loaded on said disc table;

loading means for moving said recording disc between a loading position and an unloading position; and control means for controlling a rotational velocity of said disc table, said control means controlling said spindle motor so that, when the recording disc is moved by said loading means to said loading position, the recording disc is rotated at a first rotational velocity during a first period and subsequently at a second rotational velocity slower than said first rotational velocity.

2. The disc driving device as claimed in claim 1 further comprising:

detection means for detecting the recording disc's sort; and said control means controlling the spindle motor based on the results of detection by said detecting means.

3. The disc driving device as claimed in claim 1 further comprising:

head movement means for moving said head between a first position capable of recording/reproducing information signals for the recording disc and a second position incapable of recording/reproducing information signals for the recording disc.

4. The disc driving device as claimed in claim 3 wherein said control means causes the recording head to be moved from the second position to the first position after start of rotation of said spindle motor.

5. The disc driving device as claimed in claim 1 wherein the recording disc is a flexible magnetic disc.

6. A disc driving device for removably accommodating a disc-type recording medium including a hub having a center opening and a chuck hole at a pre-determined distance from said center opening, and a recording disc attached to said hub; said disc driving apparatus comprising:

a disc table having a major surface for loading the hub of the recording disc thereon:

a spindle shaft provided on the major surface of the disc table and adapted for being fitted in said center opening;

a chuck member provided on said major surface of said disc table for rotation relative to the major surface and adapted for being fitted in said chuck hole in said hub;

a spindle motor for rotating said disc table;

a head for recording/reproducing information signals for said recording disc loaded on said disc table;

loading means for moving said recording disc between a loading position and an unloading position; and control means for controlling a rotational velocity of said disc table;

said control means controlling said spindle motor so that the disc table is rotated at a first rotational velocity when recording/reproducing information signals for the recording disc by said head;

said control means also controlling said spindle motor so that, when the recording disc is moved by said loading means to said loading position, the disc table is rotated at a second rotational velocity faster than the first rotational velocity at least for a predetermined period.

7. The disc driving device as claimed in claim 6 further comprising:

detection means for detecting the recording disc's sort; and said control means controlling the spindle motor based on the results of detection by said detection means.

8. The disc driving device as claimed in claim 7 wherein there are two sorts of the recording discs, namely a first sort of a low recording density and a second sort of a high recording density;

said control means controlling said spindle motor so that the spindle motor is rotated at a second rotational velocity faster than said first rotational velocity for a predetermined period when said detection means detects that the recording disc is the recording disc of the first sort.

9. A disc driving device for removably accommodating a disc-type recording medium including a hub having a center opening and a chuck hole at a pre-determined distance from said center opening, and a recording disc attached to said hub; said disc driving apparatus comprising:

a disc table having a major surface for loading the hub of the recording disc thereon:

a spindle shaft provided on the major surface of the disc table and adapted for being fitted in said center opening in said hub;

a chuck member provided on said major surface of said disc table for rotation relative to the major surface and adapted for being fitted in said chuck hole in said hub;

a spindle motor for rotating said disc table;

a head for recording/reproducing information signals for said recording disc loaded on said disc table;

loading means for moving said recording disc between a loading position and an unloading position;

detection means for detecting the recording disc's sort; said control means controlling the spindle motor; and control means for controlling a rotational velocity of said disc table, said control means controlling said spindle motor based on the results of detection by said detecting means so that, when the recording disc is moved by said loading means to said loading position, the recording disc is rotated at a first rotational velocity during a first period and subsequently at a second rotational velocity faster than said first rotational velocity;

wherein, if said detection means detects that the recording disc is a recording disc of the first sort, said control means controls the spindle motor so that, when the recording disc of the first sort is moved to the loading position by the loading means, the disc table is rotated at a first rotational velocity during said first period, subsequently the disc table is rotated at the second rotational velocity during a second period and subsequently the disc table is rotated at the first rotational velocity; and wherein, if said detection means detects that the recording disc is a recording disc of the second sort, said control means controls the spindle motor so that, when the recording disc of the second sort is moved to the loading position by the loading means, the disc table is rotated at the first rotational velocity during said first period, and subsequently the disc table is rotated at the second rotational velocity for a period longer than the second period.

10. The disc driving device of claim 9 further comprising:

head movement means for moving said head between a first position capable of recording/reproducing information signals for the recording disc and a second position incapable of recording/reproducing information signals for the recording disc.

11. The disc driving device of claim 10, wherein said control means causes the recording head to be moved from the second position to the first position after start of rotation of said spindle motor.

12. The disc driving device of claim 9, wherein the recording disc is a flexible magnetic disc.

* * * * *